March 19, 1929.   J. DE SEGUIRANT   1,706,352
AUTOMOBILE LOCK
Filed July 6, 1927
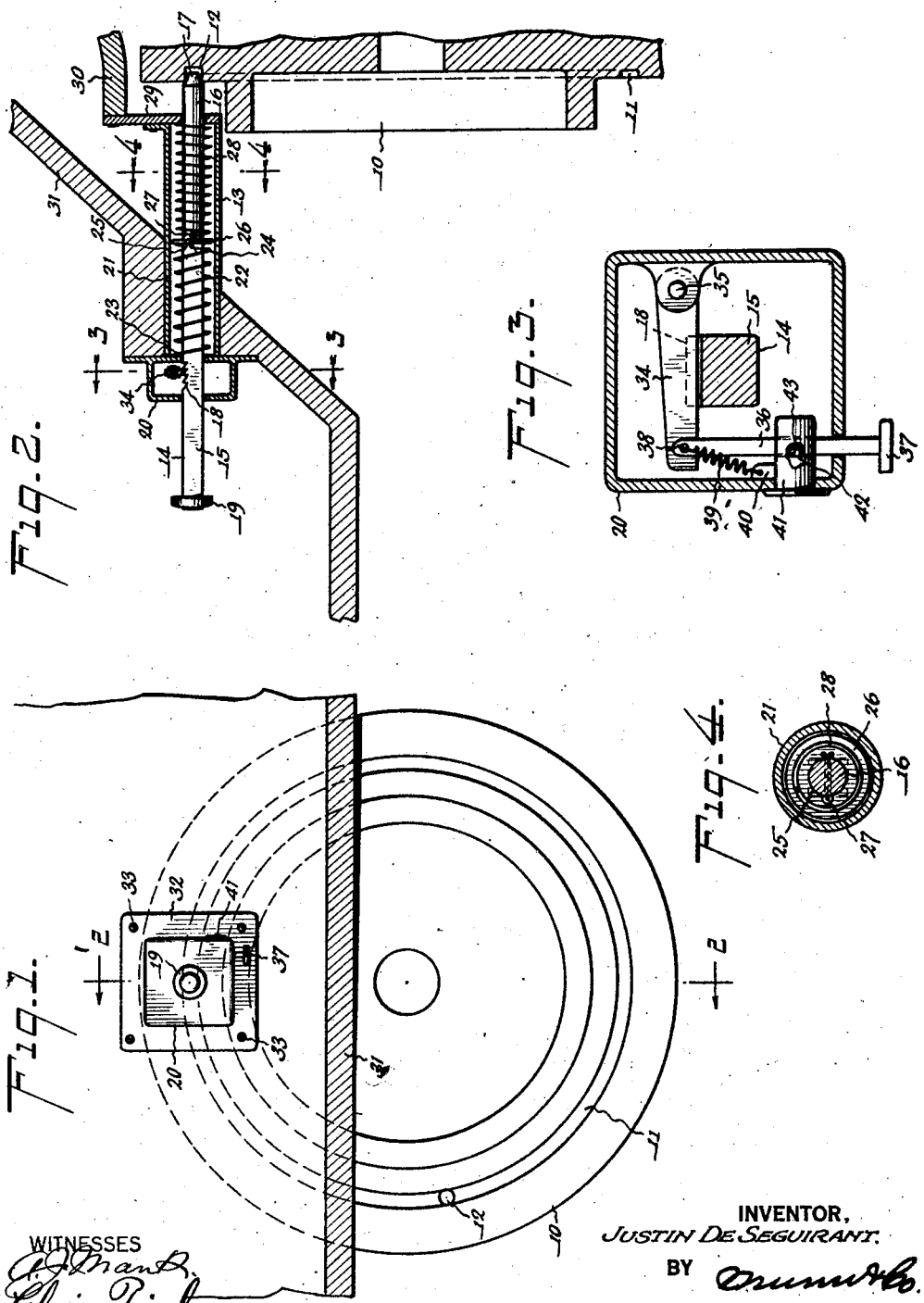
INVENTOR,
JUSTIN DE SEGUIRANT.
BY
ATTORNEY Patented Mar. 19, 1929.

1,706,352

UNITED STATES PATENT OFFICE.

JUSTIN DE SEGUIRANT, OF HONOLULU, TERRITORY OF HAWAII.

AUTOMOBILE LOCK.

Application filed July 6, 1927. Serial No. 203,850.

This invention relates to locks, and has especial reference to locks for automobiles.

The principal object of the present invention is the provision of an improved lock for use in conjunction with a driven part of an automobile motor or engine to prevent the motor or engine from being operated and the automobile being stolen by some unscrupulous person.

The nature of the invention and its distinguishing features and advantages will appear when the following specification is read in connection with the accompanying drawing, in which Figure 1 is a view illustrating one application of the lock of the present invention.

Figure 2 is a vertical sectional view taken on the line 2—2 of Figure 1.

Figure 3 is a sectional view taken on the line 3—3 of Figure 2.

Figure 4 is a sectional view taken on the line 4—4 of Figure 2.

The lock of the present invention is employed in conjunction with a movable or driven part of an automobile motor or engine, and in the present instance is employed in conjunction with the fly wheel of the motor or engine, the fly wheel being designated 10. The fly wheel 10 is provided with a circular groove 11 and one or more holes or recesses 12 in the groove 11.

The lock 13 includes a locking bolt 14 consisting of a cross sectionally square portion 15 and a cross sectionally round portion 16 having a tapered end 17. The bolt portion 15 has teeth 18, for a purpose to appear, and a manipulating knob 19. The bolt 14 extends through a casing 20 and a barrel 21 which is associated with the casing 20. The bolt 14 has sliding movement. A retractile spring 22 is employed. The said spring 22 is arranged in the barrel 21 and surrounds the portion 15 of the bolt 14. One end of the spring 22 is attached to a portion of the casing 20, as at 23, and the opposite end thereof is attached to the bolt portion 15, as at 24. The fact that the bolt 14 has a cross-sectionally square portion 15 and a cross sectionally round portion 16 provides a shoulder 25. A suitable washer 26 surrounds the portion 16 of the bolt 14 and abuts the shoulder 25. A pin 27 extends through the portion 16 of the bolt 14 and serves to hold the washer 26 in place. A compression spring 28 is employed. The said spring 28 is arranged in the barrel 21 and surrounds the portion 16 of the bolt 14. One end of the spring 28 is in engagement with the washer 26 and the opposite end thereof is in contact with a bracket member 29 attached in any suitable manner to the fly wheel housing, a portion of which is shown at 30. The bracket member 29 has a hole therein through which the portion 16 of the bolt 14 extends. The barrel 21 is attached in any suitable manner to the bracket member 29. The barrel 21 extends through the floor board 31 and is disposed parallel to the axis on which the fly wheel 10 rotates. The casing 20 has a flange 32 through which suitable fastening elements, such as screws 33, extend for securing the casing 20.

In order to prevent the bolt 14 from being moved, there is provided a latch 34 within the casing 20. The latch 34 is pivotally mounted, as at 35, and a portion thereof is adapted to be moved into and out of engagement with one of the teeth 18 of the bolt portion 15. A member 36 having a knob 37 is employed for moving the latch 34. The member 36 extends through one wall of the casing 20 and is pivotally connected, as at 38, with the free end of the latch 34. A spring 39 is employed and has one end thereof connected with the pivot 38 and the opposite end thereof is connected with a lug 40 on the inside of one of the walls of the casing 20. The spring 39 has a normal tendency to hold the latch 34 in a latching position and allows the latch 34 to be moved to an unlatching position.

In order to lock the member 36 against movement, there is provided a locking device 41 which may be of any preferred type adapted to be operated by a key. The device 41 is secured in place on one wall of the casing 20. The device 41 in the present instance is in the form of a lock of the tumbler type. The tumbler of the device 41 will include a lug 42 engageable with a notch 43 in the member 36. When the device 41 is operated by the key (not shown) the lug 42 may be moved out of the notch 43. This will permit manipulation of the member 36 for disengaging the latch 34 from engagement with one of the teeth 18 to permit the bolt 14 to be moved to disengage the tapered end 17 from the hole 12 in the fly wheel. It will be apparent that the spring 22 serves for moving the bolt 14 to retract the tapered end from the hole 12 in which it is engaged, when the latch 34 is disengaged by manipulating the knob 37. The spring 28 serves as a cushion acting on the bolt 14 while performing the operation of engaging the tapered end of the bolt into the hole 12. The tapered end 17 of the bolt 14 in engagement with the walls of the groove 11 sets up a braking or retarding action on the fly wheel 10 to bring the fly wheel to a standstill, subsequently to which the tapered end 17 will be projected into the hole 12. The latch 34 will automatically engage one of the teeth 18. The device 41 may then be operated to lock the member 36 against movement. Consequently, it will be impossible to start the engine or motor because the fly wheel will be held against rotation.

I claim:

1. The combination with a driven element of an automobile motor, of a locking bolt movable into and out of locking engagement with said driven element, a latch releasably engageable with said bolt to prevent movement of the bolt from locking engagement with said driven element, a manipulator connected with said latch, said manipulator having independent movement and adapted to be manipulated for effecting the movement of the latch to disengage it from the bolt, key operated means for locking said manipulator against movement in engagement with said bolt, said manipulator also serving for engaging the latch with said bolt when the manipulator is unlocked, and means for moving the bolt from locking engagement with said driven element when released by said latch.

2. In a lock, a locking bolt arranged for movement to a locking position and an unlocking position, a latch releasably engageable with the bolt to prevent movement of the bolt from a locking position, a manipulator connected with the latch, said manipulator having independent movement and adapted to be manipulated for effecting the movement of the latch to disengage it from the bolt, key operated means for locking said manipulator against movement in engagment with said bolt, said manipulator also serving for engaging the latch with said bolt when the manipulator is unlocked, and means for moving the bolt to an unlocking position when released by the latch.

3. A lock comprising a casing, a barrel extending from said casing, a bolt extending through the casing and barrel and supported for movement to a locking position and an unlocking position, one end of the bolt disposed exteriorly of the casing and having a manipulating knob, the opposite end of the bolt being the locking end and disposed exteriorly of the barrel, means within the barrel having a normal tendency to retract the bolt from a locking position, and means arranged interiorly of the casing and adapted to be operated exteriorly of the casing and under the control of a key for locking said bolt against movement from its locking position.

4. A lock comprising a casing, a barrel extending from said casing, a bolt extending through the casing and barrel and supported for movement to a locking position and an unlocking position, one end of the bolt disposed exteriorly of the casing and having a manipulating knob, the opposite end of the bolt being the locking end and disposed exteriorly of the barrel, means within the barrel having a normal tendency to retract the bolt from a locking position, means cushioning the bolt while being moved to the locking position, and means arranged interiorly of the casing and adapted to be operated exteriorly of the casing and under the control of a key for locking said bolt against movement from its locking position.

5. In a lock, a locking bolt arranged for movement, a latch releasably engageable with said bolt to hold the bolt in different locking positions, a manipulator connected with the latch, said manipulator having independent movement and adapted to be manipulated for effecting the movement of the latch to disengage it from the bolt, key operated means for locking said manipulator against movement in engagement with said bolt, said manipulator also serving for engaging the latch with said bolt when the manipulator is unlocked, and means for moving the bolt to an unlocking position when released by the latch.

6. The combination with a driven element of a motor; of means adapted to engage the driven element to retard the motion thereof and to be brought into engagement therewith when the driven element is brought to a standstill to prevent the movement of the driven element, means engageable with the first mentioned means to hold the first mentioned means in engagement with the driven element and disengageable therefrom to allow the first mentioned means to be moved out of engagement with the driven element, yieldable means acting on the first mentioned means to move it out of engagement with the driven element, and means for locking the second mentioned means in engagement with the first mentioned means to hold the latter in engagement with said driven element.

7. The combination with the flywheel of a motor; of a rigid member adapted to contact with the flywheel to retard the motion thereof and to be brought into engagement therewith when the flywheel is brought to a standstill to prevent the movement of the flywheel, a device serving to hold the rigid member in engagement with the flywheel, said device also being operable to release said rigid member for movement out of engagement with the flywheel, yieldable means acting on the rigid member to hold it out of engagement with the flywheel when released by said device, and locking means for controlling the operation of said device.

JUSTIN DE SEGUIRANT.